United States Patent [19]

Cory

[11] 4,267,911
[45] May 19, 1981

[54] CLUTCH-BRAKE UNIT

[75] Inventor: Halsey W. Cory, Fairfield, Ohio

[73] Assignee: Force Control Industries, Inc., Hamilton, Ohio

[21] Appl. No.: 904,764

[22] Filed: May 11, 1978

Related U.S. Application Data

[62] Division of Ser. No. 777,312, Mar. 14, 1977, abandoned.

[51] Int. Cl.³ .................... B60K 41/24; F16D 13/74
[52] U.S. Cl. ............................ 192/18 A; 192/113 B
[58] Field of Search .................... 192/113 B, 18 A; 233/23 R, 24, 1 R

[56] References Cited

U.S. PATENT DOCUMENTS

| | | | |
|---|---|---|---|
| 3,080,774 | 3/1963 | Nickerson et al. | 192/113 B |
| 3,638,773 | 2/1972 | Lewis | 192/113 B |
| 3,915,269 | 10/1975 | Houser | 192/113 B |
| 3,924,715 | 12/1975 | Cory | 192/113 B |
| 4,074,663 | 2/1978 | Cory | 192/113 B |

Primary Examiner—George H. Krizmanich
Attorney, Agent, or Firm—Dybvig & Dybvig

[57] ABSTRACT

A rotary centrifuge basket or container is suspended from a center drive shaft depending from a part-spherical bearing assembly mounted on a frame whereby the rotating container may also gyrate about the center point of the bearing. An oil shear clutch-brake unit includes a housing mounted on the frame and has a vertical output shaft formed as an extension of the container drive shaft. An aligned vertical input shaft is rotatably supported by the housing and projects upwardly to connect with the vertical drive shaft of an electric motor supported by the housing. A clutch includes a series of annular clutch plates which rotate with the input shaft and interfit between a series of annular clutch discs which rotate with the output shaft. A brake includes a series of brake discs which also rotate with the output shaft and interfit between a series of brake plates connected to the housing. The gyratory center point of the suspended container is located within the center of the clutch plates, and cooling oil is supplied to the center of the clutch plates through an axial passage formed within the output shaft. Cooling oil is independently supplied to the center of the brake plates through an annular chamber surrounding the output shaft, and the clutch and brake are selectively operated by axial movement of a nonrotating concentric piston actuated by fluid supplied through passages formed within the base of the housing.

4 Claims, 2 Drawing Figures

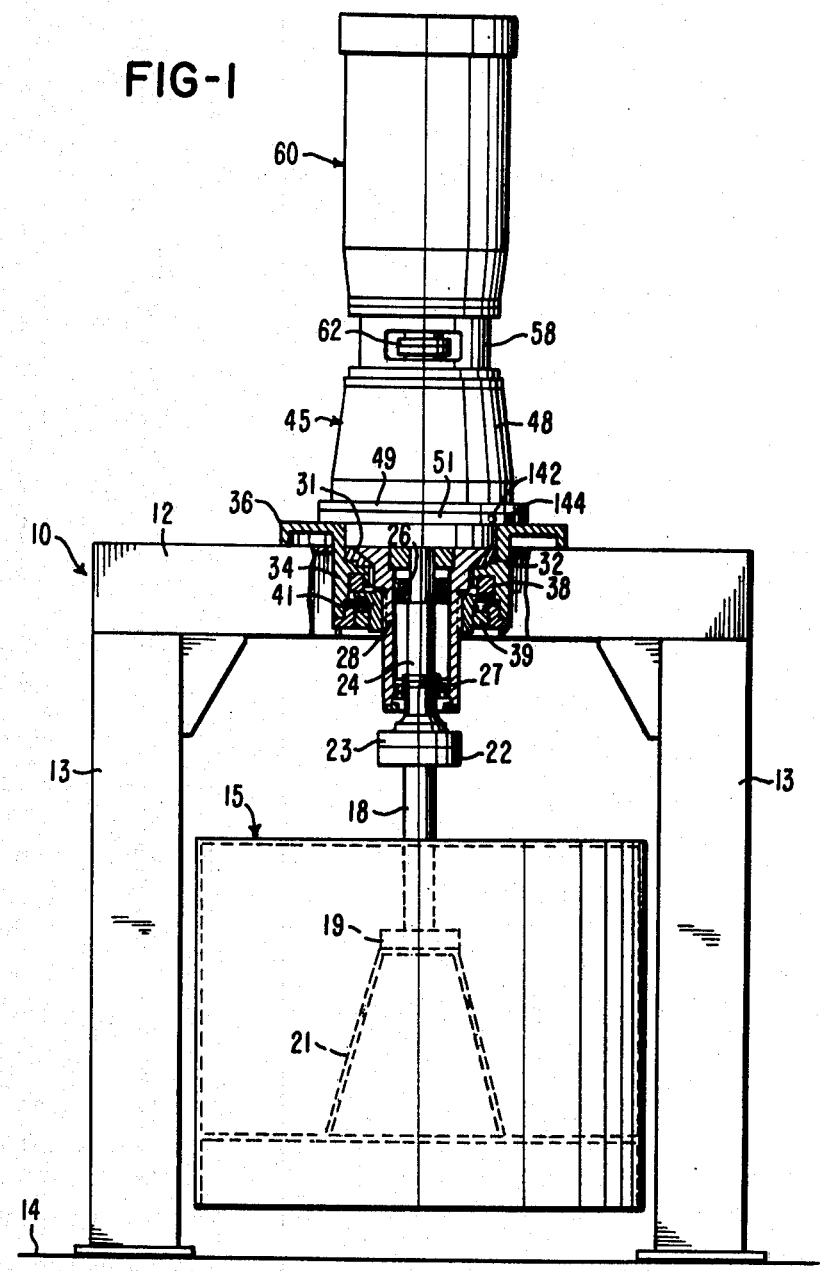

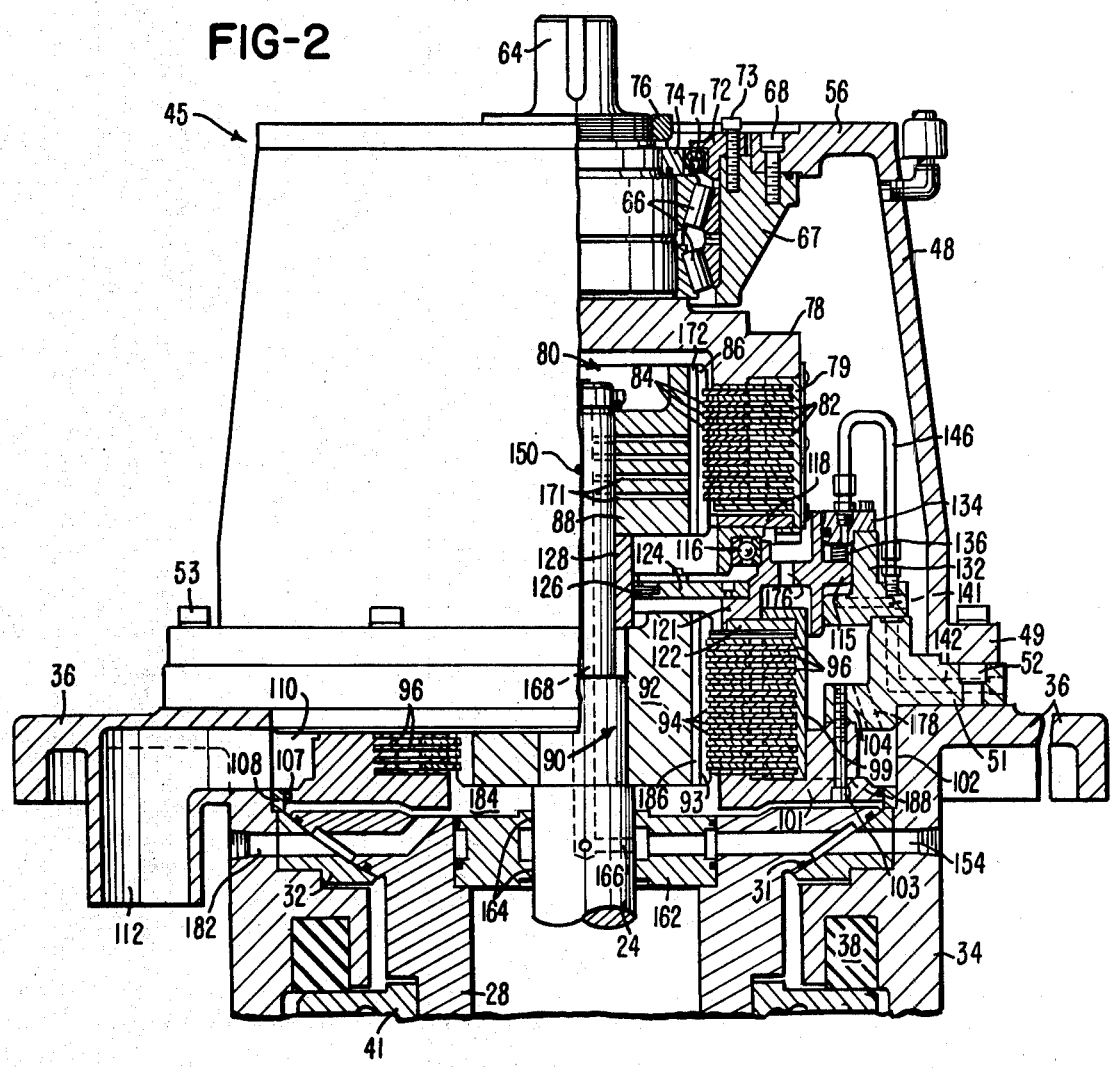

CLUTCH-BRAKE UNIT

RELATED APPLICATION

This application is a division of U.S. Application Ser. No. 777,312, filed Mar. 14, 1977, and now abandoned.

BACKGROUND OF THE INVENTION

In the art of centrifuges, for example, of the general type disclosed in U.S. Pat. No. 3,970,470, a perforated basket or container is adapted to receive a load of material, such as sugar, which requires centrifuging to extract liquid and moisture from the material. Commonly, the container is mounted on top of a drive shaft which is rigidly connected to the bottom of the container, and the bottom of the drive shaft is supported by a thrust bearing which permits orbital movement of the container while the container is rotating. According to one system for rotating the container, a belt drive extends laterally from the bottom drive shaft for the container to the output shaft of a vertically arranged clutch-brake unit such as a unit disclosed in U.S. Pat. No. 3,924,715 which issued to the assignee of the present invention. The vertical input shaft of the clutch-brake unit is driven continuously by an electric motor which is located above and in vertical alignment with the laterally offset clutch-brake unit.

Another form of drive system for a centrifuge basket or container, incorporates an electric motor located directly below the container and having an armature or rotor mounted directly on the shaft supporting the bottom of the container. The armature or rotor of the electric motor orbits with the centrifuge container and is surrounded by an annular motor stator. If a sufficient annular gap is provided between the rotor and the stator, the stator may be secured directly to the frame of the centrifuge. As an alternative, the motor stator housing may be resiliently supported and connected through bearings to the drive shaft so that the entire motor including the stator and rotor gyrate with the basket or container.

SUMMARY OF THE INVENTION

The present invention is directed to an improved drive system for a centrifuge basket or container which is suspended by a center drive shaft and wherein the drive shaft is supported for both rotary movement and gyratory movement about a point located above the center of gravity of the centrifuge container. The drive system of the invention provides for minimizing the mass of the rotating components of the centrifuge and also provides for dampening the gyratory movement of the rotating components of the centrifuge in addition to being more economical in construction than previous centrifuge drive systems. Thus the drive system of the invention eliminates the need for a laterally extending belt drive system and for replacing worn belts, thereby providing the centrifuge with a more dependable operation.

Other features and advantages of the drive system of the invention will be apparent from the following description, the accompanying drawings and the appended claims.

BRIEF DESCRIPTION OF THE DRAWINGS

FIG. 1 is an elevational view of a drive system constructed in accordance with the invention for driving a centrifuge illustrated diagrammatically and with a portion broken away to show the support for the rotary centrifuge container; and FIG. 2 is an enlarged view of the drive system of the invention with a portion shown in axial section.

DESCRIPTION OF THE PREFERRED EMBODIMENT

The centrifuge illustrated in FIG. 1 generally incorporates a fabricated steel frame 10 which includes a horizontal platform or deck 12 supported by a set of four columns or corner legs 13 which are secured to a floor surface 14. A perforated centrifuge basket or container 15 is suspended from the deck 12 by a drive shaft 18 having a bottom flange portion 19 secured to an inverted frusto-conical hub portion 21 of the container 15. The drive shaft 18 has an upper flange portion 22 which is rigidly coupled to a mating lower flange portion 23 of a shaft 24 which forms a rigid extension of the drive shaft 18. The shaft 24 is rotatably supported by a set of axially spaced bearings 26 and 27 which are retained within a tubular bearing sleeve 28. The upper portion of the bearing sleeve 28 has an outwardly projecting portion with a part-spherical bearing surface 31 which seats on a mating surface formed on a bronze bearing ring 32. The bearing ring 32 is retained within an annular bearing retaining housing 34 having an outwardly projecting upper peripheral flange portion 36 which seats on the deck 12 of the frame 10.

The bearing retaining housing 34 also retains a set of vertically spaced dampening rings 38 and 39 (FIG. 1) which are molded of a resilient material. The upper dampening ring 38 engages an outwardly projecting flange portion of an annular collar 41 mounted on the bearing sleeve 28, and the lower dampening ring 39 engages the lower cylindrical outer surface of the collar 41. Thus the centrifugal container 15 and the connected shafts 18 and 24 are supported for rotation by the rotating bearing sleeve 28 which is free to move universally on the part-spherical seat of the bearing ring 32 to permit gyratory movement of the bearing housing 28 and the container 15 in response to unbalanced conditions of a load of material within the container 15. The resilient rings 38 and 39 function to dampen the gyratory movement of the bearing sleeve 28 and the centrifuge container 15.

In accordance with the present invention, the centrifuge container 15 and its supporting drive shafts 18 and 24 are driven by a drive system which includes a clutch-brake unit 45 mounted on the flange portion 36 of the annular bearing retaining housing 34. The unit 45 includes an annular cast metal housing 48 (FIG. 2) having an outwardly projecting bottom flange portion 49 which seats on an annular housing base member 51 secured to the flange portion 36 of the bearing retaining housing 34 by a series of peripherally spaced screws 52. Another series of peripherally spaced screws 53 secure the bottom flange portion 49 of the housing 48 to the annular housing base member 51.

The housing 48 includes an inwardly projecting top flange portion 56 which supports a generally cylindrical base 58 (FIG. 1) for an electric motor 60 having a vertical shaft aligned with the shafts 18 and 24. In one experimental prototype machine, the motor 60 had a two speed output of 600 rpm and 1200 rpm and was capable of producing substantial horsepower, for example, on the order of 50 horsepower. The shaft of the motor 60 is connected by a coupling 62 (FIG. 1) to an input shaft 64 (FIG. 2) for the clutch-brake unit 45. The input shaft 64 is rotatably supported by a set of bearings 66 which are retained within a ring 67 secured to the housing flange portion 56 by a series of circumferentially spaced screws 68. A shaft seal 71 is retained within a ring 72 secured to the ring 67 by screws 73, and the seal 71 engages a bushing 74 secured to the input shaft 64 by a retaining nut 76.

The input shaft 64 includes an outwardly projecting lower flange portion 78 from which depends a set of four peripherally spaced integrally formed lugs 79. The input shaft 64 is selectively coupled to the shaft 24, which forms the output shaft of the clutch-brake unit 45, by a clutch assembly 80 which includes a stack or series of axially movable annular clutch plates 82 having peripherally spaced notches for receiving the lugs 79 of the input shaft 64 so that the clutch plates 82 rotate with the input shaft. The clutch plates 82 interfit between a stack or series of axially movable annular clutch discs 84 which are connected by a spline 86 to an annular hub member 88 secured to the upper end portion of the shaft 24. The hub 88 is keyed to the upper end portion of the output shaft 24 so that the hub and clutch discs 84 rotate with the output shaft.

A brake assembly 90 is provided for the output shaft 24 and includes an annular hub member 92 which is keyed to rotate with the shaft 24 and is connected by a spline 93 to a stack or series of axially movable annular brake discs 94 which rotate with the output shaft 24. A stack or series of axially movable annular brake plates 96 interfit between the brake discs 94 and have peripherally spaced notches for receiving a set of circumferentially spaced lugs 99 cast as an integral part of an annular brake member 101 located within a cylindrical bore 102 formed within the bearing retaining housing 34. The brake member 101 is secured by a series of screws 103 to an inwardly projecting flange portion 104 of the housing base member 51. An oil ring seal 107 extends between the outer peripheral surface of the brake member 101 and a surrounding rigid ring 108 retained by the housing 34 to form an annular oil collecting chamber 110 having a drain outlet 112.

The selective operation of the clutch assembly 80 or brake assembly 90 is performed by vertical or axial movement of a nonrotating annular piston 115 which is connected through an anti-friction bearing 116 to an annular clutch pressure plate 118. The plate 118 is located at the bottom of the stack of clutch plates 82 and has peripherally spaced notches for slidably receiving the lugs 79 of the input shaft 64. The annular piston 115 also includes an annular portion 121 which carries an annular brake pressure plate 122 having peripherally spaced notches for slidably receiving the stationary lugs 99 of the brake member 101. The piston 115 also supports partition means including an annular baffle plate 124 which retains a low friction plastic ring 126 forming a substantially fluid tight seal between the baffle plate 124 and a cylindrical sleeve 128 mounted on the output shaft 24 between the clutch hub 88 and the brake hub 92.

The outer peripheral portion of the piston 115 is movable within a fluid cylinder assembly which includes an annular cylinder member 132 secured to the annular housing base member 51 by screws (not shown). A cylinder closure or cover ring 134 is secured to the cylinder member 132 and has circumferentially spaced bores for receiving a series of compression springs 136 which normally urge the piston 115 downwardly to release the clutch assembly 80 and apply the brake assembly 90. The piston 115 is shifted upwardly to engage the clutch assembly 80 by introducing fluid pressure through a passage 141 formed within the cylinder member 132 and connecting with a fluid passage 142 formed within the housing base member 51. The actuating fluid may be either air or oil and is applied through a pressure line connected to the outer end of the passage 142.

Another passage 144 (FIG. 1) is formed within the housing base member 51 in circumferentially spaced relation to the passage 142 and connects with the aligned vertical passage within the cylinder member 132 (FIG. 2). The passage 142 also aligns with a passage defined within an inverted U-shaped tube 146 to provide for supplying or directing actuating fluid through the closure ring 134 to the top side of the piston 115. Thus by supplying actuating fluid selectively to the passages 142 and 144, the piston 115 is moved upwardly or downwardly in order to engage the clutch assembly 80 or the brake assembly 90, respectively. As shown in FIG. 2, a set of resilient sealing rings are retained by the actuating cylinder assembly and engage the outer peripheral surfaces of the piston 115 to form fluid-tight seals.

As shown in FIG. 2, the part-spherical bearing surface 31 which supports the bearing sleeve 28 for gyratory movement, has a center point 150 which is located on the rotational axis of the shafts 24 and 64 and within the center of the clutch assembly 80 or clutch discs 84. Thus when the centrifuge container 15 is being driven through the engaged clutch assembly 80 and the container is gyrating due to an unbalanced condition, there is substantially no radial movement of the clutch discs 84 relative to the engaged clutch plates 82. This feature provides the clutch assembly 80 with a long service life and permits extended operation of the centrifuge without downtime for servicing. This feature also provides for minimizing power loss during acceleration.

The clutch-brake unit 45 provides for a flow of cooling and lubricating oil outwardly between the interfitting clutch plates 82 and clutch discs 84 and also provides for an independent supply of cooling and lubricating oil outwardly between the interfitting brake discs 94 and brake plates 96. The outward flow of oil for the clutch assembly 80 is supplied through a supply line connected to a passage 154 (FIG. 2) whih extends radially inwardly through the bearing retaining housing 34. The passage 154 continues through the bearing sleeve 28 and through an annular collar 162 which is retained by the bearing sleeve 28 and has axially spaced laryrinth seals 164 closely surrounding the output shaft 24.

A radial passage 166 forms an extension of the passage 154 within the output shaft 24 and connects with a passage 168 which extends axially through the center of the upper end portion of the output shaft 24. The passage 168 connects with a plurality of radial passages 171 which extend outwardly through the upper end portion of the shaft 24 and the clutch hub member 88 to corresponding circumferentially spaced and axially extending grooves 172 formed within the splined outer surface of the clutch hub member 88. Preferably, the radial faces of the clutch discs 84 are provided with circumferentially spaced V-grooves (not shown) to assure a continuous outward flow of oil even when the clutch assembly 80 is engaged. As the oil flows outwardly between the clutch plates 82, the oil drains downwardly through circumferentially spaced holes 176 formed within the piston 115 and then downwardly through circumferentially spaced holes 178 formed within the inner flange portion 104 of the housing base member 51. The oil collects within the annular chamber 110 and drains downwardly through the outlet 112 which is connected to an oil supply reservoir (not shown). An oil recirculating pump (not shown) pumps the oil from the reservoir through a heat exchanger for removing heat from the oil and then to the passage 154.

Cooling and lubricating oil is supplied into the annular brake discs 94 through a supply line connected to a passage 182 which extends inwardly through the bearing retaining housing 34, the part-spherical bearing ring 32 and the bearing sleeve 28 to an annular chamber 184 located directly below the brake hub member 92. The oil flows upwardly within circumferentially spaced and axially extending grooves 186 formed within the splined outer surface of the brake hub member 92, and flows from the grooves 186 outwardly between the interfitting brake discs 94 and brake plates 96. Circumferentially spaced slots 188 are formed within the stationary brake pressure member 101 so that the oil flowing through the brake assembly 90 is also collected within the annular chamber 110 for return to the oil reservoir through the drain outlet 112.

From the drawings and the above description, it is apparent that a centrifuge drive system constructed in accordance with the present invention, provides desirable features and advantages. As mentioned above, the location of the center point 150 of gyratory movement within the center of the clutch assembly 80 permits the housing 48 to be rigidly secured to the frame 10, and the gyratory movement of the suspended rotating container 15 produces no significant radial or gyratory movement of the clutch discs 84 between the clutch plates 82 when the clutch assembly 80 is engaged. Furthermore, when the brake assembly 90 is engaged to bring the basket or container 15 to a stop, which takes some time, the oil shear effect between the brake plates 96 and brake discs 94 provides for dampening the orbital movement of the container 15 and its supporting shafts 18 and 24. This dampening effect is desirable in the event the load shifts during deceleration.

As also mentioned above, the clutch-brake unit 45 provides for supplying cooling and lubricating oil from the lower output end of the unit 45 and independently to the clutch assembly 80 and the brake assembly 90. This independent oil supply cooperates with the separating partition or baffle 124 and seal 126 to assure that oil continues to be forced outwardly between either the engaged clutch plates and discs or the engaged brake plates and discs and does not take the path of least resistance through the disengaged plates and discs. In addition, the construction of the clutch-brake unit 45 provides for convenient assembly of the clutch-brake unit since all of the internal components of the unit may be assembled before the housing 48 is assembled.

While the form of drive system herein described constitutes a preferred embodiment of the invention, it is to be understood that the invention is not limited to this precise form of drive system, and that chanbes may be made therein without departing from the scope and spirit of the invention as defined in the appended claims.

The invention having thus been described, the following is claimed:

1. In a clutch-brake unit including a housing enclosing an input shaft aligned axially with an output shaft, a clutch assembly including at least one annular clutch plate mounted on said input shaft and disposed adjacent at least one annular clutch disc connected for rotation with said output shaft, a brake assembly including at least one annular brake disc connected to rotate with said output shaft and disposed adjacent at least one annular brake plate connected to said housing, and means for compressing said clutch plate and disc together to effect driving of said output shaft and for compressing said brake plate and disc together to effect braking of said output shaft, the improvement comprising means for directing separate flows of cooling and lubricating fluid within said housing between said clutch disc and plate and between said brake disc and plate, and partition means disposed between said clutch assembly and said brake assembly for substantially maintaining said separate flows of fluid through said clutch and brake assemblies, said means for compressing said clutch and brake discs and plates comprise a non-rotating annular piston and an annular cylinder supporting said piston for axial movement, and said partition means include a non-rotating annular baffle mounted on said piston for axial movement therewith.

2. A clutch-brake unit as defined in claim 1 including means forming an annular seal between said baffle and said output shaft to limit the flow of fluid therebetween.

3. A clutch-brake unit comprising a housing enclosing a vertical input shaft disposed above an axially aligned output shaft, a clutch assembly including a plurality of annular clutch plates mounted for rotation with said input shaft and interfitting with a plurality of annular clutch discs mounted for rotation with said output shaft, a brake assembly disposed below said clutch assembly and including a plurality of annular brake discs mounted for rotation with said output shaft and interfitting with a plurality of non-rotating annular brake plates connected to said housing, means including a non-rotating piston disposed between said clutch and brake assemblies for compressing said clutch plates and discs together to effect driving of said output shaft and for compressing said brake plates and discs together to effect braking of said output shaft, means defining passages within said output shaft for directing a flow of cooling and lubricating fluid from a pressurized supply to the inner surfaces of said clutch discs and plates, means defining separate passages associated with said output shaft for directing a flow of cooling and lubricating fluid from a pressurized supply to the inner surfaces of said brake discs and plates, and an annular baffle member connected to move with said piston and closely surrounding a rotary portion of said output shaft to limit the flow of fluid between said clutch and brake assemblies before the fluid flow radially outwardly between said discs and plates of each assembly.

4. A clutch-brake unit as defined in claim 3 including means forming a fluid seal between the center portion of said baffle member and said rotary portion of said output shaft.

* * * * *